United States Patent [19]

Hammond

[11] Patent Number: 5,283,874
[45] Date of Patent: Feb. 1, 1994

[54] CROSS COUPLING MECHANISMS FOR SIMULTANEOUSLY COMPLETING CONSECUTIVE PIPELINE INSTRUCTIONS EVEN IF THEY BEGIN TO PROCESS AT THE SAME MICROPROCESSOR OF THE ISSUE FEE

[75] Inventor: Gary N. Hammond, Campbell, Calif.

[73] Assignee: Intel Corporation, Santa Clara, Calif.

[21] Appl. No.: 779,636

[22] Filed: Oct. 21, 1991

[51] Int. Cl.⁵ .................... G06F 9/38; G06F 9/28
[52] U.S. Cl. .................... 395/375; 364/DIG. 1; 364/244.3; 364/247.7; 364/254.5; 364/262.4
[58] Field of Search ................. 395/375, 775

[56] References Cited

U.S. PATENT DOCUMENTS

| | | | |
|---|---|---|---|
| 4,476,525 | 10/1984 | Ishii | 395/375 |
| 4,594,655 | 6/1986 | Hao et al. | 395/775 |
| 4,858,105 | 8/1989 | Kuriyama et al. | 395/375 |
| 4,916,606 | 4/1990 | Yamaoka et al. | 395/375 |
| 4,916,652 | 4/1990 | Schwarz et al. | 364/748 |
| 4,928,226 | 5/1990 | Kamada et al. | 395/375 |
| 4,933,841 | 6/1990 | Mori et al. | 395/375 |
| 4,942,525 | 7/1990 | Shintani et al. | 395/375 |
| 5,091,853 | 2/1992 | Watanabe et al. | 395/375 |
| 5,148,529 | 9/1992 | Ueda et al. | 395/375 |

*Primary Examiner*—Parshotam S. Lall
*Assistant Examiner*—Krisna Lim
*Attorney, Agent, or Firm*—Blakely, Sokoloff, Taylor & Zafman

[57] ABSTRACT

Apparatus and methods for expediting the completion of microprocessor instructions using a microprocessor pipelining system. Two or more dependent instructions processed through two or more microprocessor pipelines are simultaneously completed. This simultaneous completion of the two or more dependent instructions is achieved by the use of an Advanced Cross Coupler which operates as a link between a number of pipelines.

23 Claims, 12 Drawing Sheets

| U PUSH | V PUSH | U POP | V POP | U OFFSET | V OFFSET | S OFFSET |
|--------|--------|-------|-------|----------|----------|----------|
| 1 | 1 | 0 | 0 | -2 | -4 | -4 |
| 1 | 0 | 0 | 1 | -2 | -2 | 0 |
| 0 | 0 | 1 | 1 | 0 | 2 | 4 |
| 0 | 1 | 1 | 0 | 0 | 0 | 0 |

Fig. 6b  (Not all combinations are shown.)

| Y INC | Z INC | Y DEC | Z DEC | Y OFFSET | Z OFFSET |
|-------|-------|-------|-------|----------|----------|
| 1 | 1 | 0 | 0 | 1 | 2 |
| 1 | 0 | 0 | 1 | 1 | 0 |
| 0 | 1 | 1 | 0 | -1 | 0 |
| 0 | 0 | 1 | 1 | -1 | -2 |

CROSS COUPLING MECHANISMS FOR SIMULTANEOUSLY COMPLETING CONSECUTIVE PIPELINE INSTRUCTIONS EVEN IF THEY BEGIN TO PROCESS AT THE SAME MICROPROCESSOR OF THE ISSUE FEE

BACKGROUND OF THE INVENTION

1. Field of the Invention

The present invention relates to pipelining systems in microprocessors. More particularly, the present invention relates to execution of microprocessor instructions using two or more pipelines.

2. Description of the Prior Art

Most conventional microprocessors have a "pipelined" architecture to increase the processing speed of microprocessor instructions. FIG. 1 illustrates a typical conventional pipeline for processing typical instructions. The processing of such typical instructions consists of four stages: instruction fetch (referred to as F), instruction decode (referred to as D), operand address computation (referred to as A), and execution/operand fetch/operand store (referred to as X). Typically, it takes one microprocessor clock cycle for an instruction to be processed through one stage. Older microprocessors, which did not use a pipelined architecture, processed one instruction through all the four stages including the final stage of execution before any processing of a new instruction could begin. However, the more recent microprocessors, using pipelined architectures allow parallel processing of two or more instructions. This parallel processing, in the more recent microprocessors has been extended even to instructions which have a "dependency" on a previous instruction. The term "dependency" describes a condition where one instruction must wait for the result of the execution of a previous instruction. An example of such a dependency is when a first instruction I1 is an instruction to increment a value stored in a register R1, and a second instruction I2 is also an instruction to increment the value stored in the same register R1.

First, referring to cases where there is no dependency between I1 and I2, and using the typical four stages discussed above, two typical instructions I1 and I2 are processed through a pipeline as shown in FIG. 2a: During the clock cycle in which I1 is being processed by the instruction decode stage, I2 is being processed by the instruction fetch step. Likewise, when I1 is going through the address computation stage, I2 is going through the instruction decode step. Finally, when I1 is going through the final stage of execution, I2 is going through the address computation stage. Thus, using the conventional pipeline architecture and for two typical, consecutive and non-dependent instructions, I2 lags I1 by one clock cycle.

Even for cases where there is a dependency between two or more consecutive instructions, for example when both I1 and I2 are instructions to increment R1, the more recent microprocessor pipelines accommodate processing such instructions with only one clock cycle time difference between the completion of the consecutive instructions. Two examples of dependent instructions are shown in FIGS. 2b and 2c. FIG. 2b shows that according to the more recent microprocessor pipelines two consecutive INCREMENT (referred to as INC) instructions can be accomplished with only one clock cycle time difference. FIG. 2c shows the one clock cycle time difference for another set of consecutive and dependent instructions, namely two "PUSH" instructions. A PUSH instruction essentially stores a value into a memory location addressed by a register usually called a Stack Pointer Register. Thus, when I1 and I2 are both PUSH instructions, I2 must wait for an updated value of the Stack Pointer Register to write into a new memory location addressed thereby. As such, two PUSH instructions are considered to be dependent instructions. Further, in the more recent microprocessors special hardware allows an "advanced stack pointer" to be updated with a new stack pointer value at the end of address computation of instruction I1. This updated value of the "advanced stack pointer" can be used in the next clock cycle for the address computation of instruction I2. Thus, as shown in FIGS. 2b and 2c, the more recent pipelined microprocessors can complete even two data dependent instructions (like two INCREMENT instructions) or two stack instructions (like two PUSH instructions) with a time difference of only one clock cycle.

A still further improvement in the speed of pipelined microprocessors of the prior art relates to the concept of "superscalers." FIG. 3a depicts a general simplified superscaler of the prior art. This figure shows two pipeline branches. Each pipeline branch has a fetch stage, a decode stage, an address computation stage, and finally an execution stage. It will be recalled that those prior art microprocessors which lacked a superscaler pipeline architecture were unable to complete any two instructions simultaneously, regardless of whether one instruction was dependent on a previous instruction: Without the superscaler architecture, even when I1 and I2 were completely independent, the prior art required a time lag of at least one clock cycle between the completion of I2 and the completion of I1. However, using the superscaler pipeline architecture a microprocessor can execute two independent and consecutive instructions simultaneously (i.e. in the same clock cycle) as illustrated in FIG. 3b. Nevertheless, even in the superscaler pipeline architecture two consecutive but dependent instructions cannot be completed simultaneously. In that regard FIG. 3c uses two PUSH instructions as examples of two dependent instructions. As FIG. 3c illustrates, the prior art superscalers fail to extend any advantage when two consecutive instructions are dependent, since the completion of the second instruction lags the completion of the first instruction by one clock cycle.

Thus, the purpose of the present invention is to design a microprocessor pipelining system such that any two consecutive instructions, even if the two instructions are dependent, may be simultaneously completed. Furthermore, the present invention also allows the simultaneous completion of even more than two dependent instructions.

BRIEF SUMMARY OF THE INVENTION

Apparatus and methods for expediting the completion of microprocessor instructions using a microprocessor pipelining system is disclosed. According to the present invention two or more dependent instructions processed through two or more microprocessor pipelines are simultaneously completed. This simultaneous completion of the two or more dependent instructions is achieved by the use of various embodiments of the present invention's Advanced Cross Coupler which operates as a link between a number of pipelines.

BRIEF DESCRIPTION OF THE DRAWINGS

FIG. 3b shows the timing of the processing of two typical instructions using the prior art superscaler pipeline architecture of FIG. 3a.

FIG. 3c shows the timing of the processing of two dependent instructions using the prior art superscaler pipeline architecture of FIG. 3a.

FIG. 4b shows the timing of the processing of two typical instructions according to the pipelining system of FIG. 4a.

FIG. 4c shows the timing of the processing of two dependent instructions according to the pipelining system of FIG. 4a.

FIG. 4d shows the the timing of the processing of all four combinations of two dependent instructions according to the pipelining system of FIG. 4a.

FIG. 5b shows the timing of the processing of two typical instructions according to the pipelining system of FIG. 5a.

FIG. 5c shows the timing of the processing of all four combinations of two dependent instructions using the pipelining system of FIG. 5a.

FIG. 6a is a detailed illustration of the Advanced Cross Coupler of FIG. 4a.

FIG. 6b is a table corresponding to the status of various signals of FIG. 6a.

FIG. 7a is a detailed illustration of the Advanced Cross Coupler of FIG. 5a.

FIG. 7b is a table corresponding to the status of the various signals of FIG. 7a.

FIG. 8b is a detailed illustration of the Advanced Cross Coupler of FIG. 8a.

FIG. 9b is a detailed illustration of the Advanced Cross Coupler of FIG. 9a.

DETAILED DESCRIPTION OF THE INVENTION

Figure 4A:
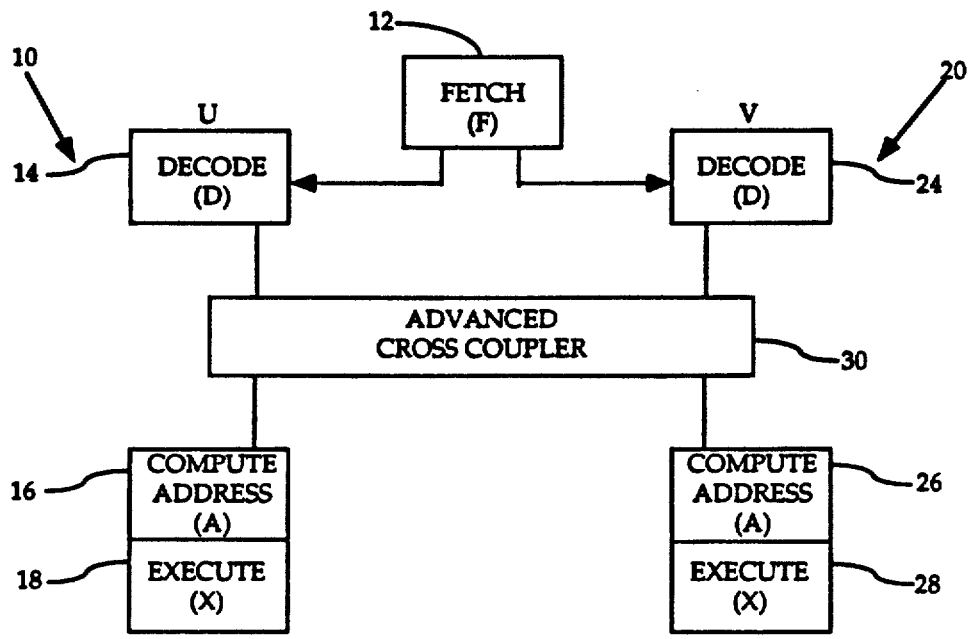
FIG. 4a shows one embodiment of the pipelining system of the present invention utilizing the Advanced Cross Coupler with two pipelines where each pipeline has four stages.

First and for ease of illustration, a very simplified embodiment of the microprocessor pipelining system of the present invention is shown in FIG. 4a. As shown in FIG. 4a, a common fetch stage 12 is shared between the U pipeline and the V pipeline. Further, the U pipeline referred to generally by 10 is comprised of a decode stage 14, an address computation stage 16, and finally an execution stage 18. Similarly, the V pipeline referred to generally by 20 is shown with a decode stage 24, an address computation stage 26, and finally an execution stage 28. The Advanced Cross Coupler 30 shown in FIG. 4a, links the U pipeline 10 to the V pipeline 20 so as to share the computations of the two pipelines as will be illustrated later in this document. According to the embodiment of the present invention shown in FIG. 4a, the Advanced Cross Coupler 30 coordinates the address computation stages 16 and 26 such that instruction I1 processed through the U pipeline 10 is completed in the same clock cycle in which instruction I2, processed through the V pipeline 20 is completed. This is so even if instruction I2 is dependent upon instruction I1.

Figure 1:
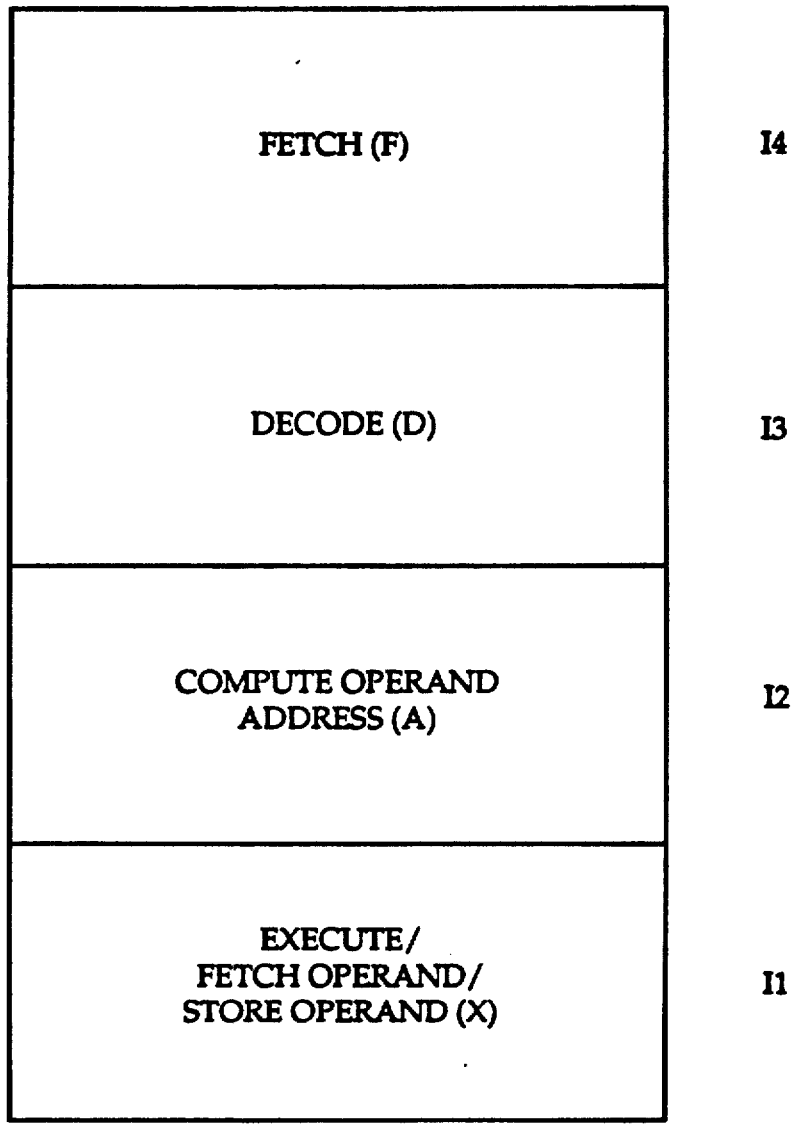
FIG. 1 shows a typical prior art pipeline through which a microprocessor instruction is processed.
Figure 2A:
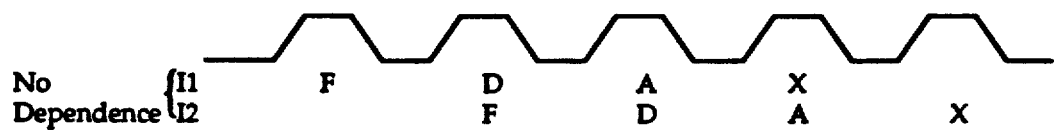
FIG. 2a shows the timing of the processing of two typical instructions according to the prior art.
Figure 2B:
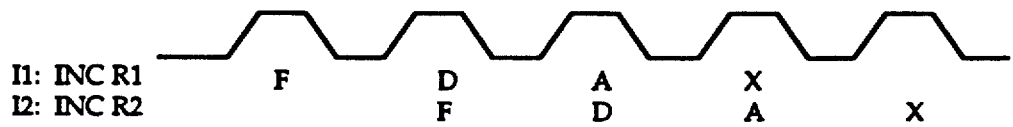
FIG. 2b shows the timing of the processing of two dependent instructions according to the prior art.
Figure 2C:
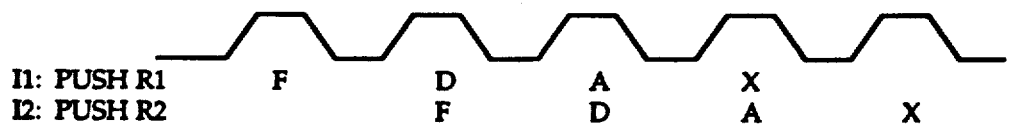
FIG. 2c shows the timing of the processing of another set of two dependent instructions according to the prior art.
Figure 3A:
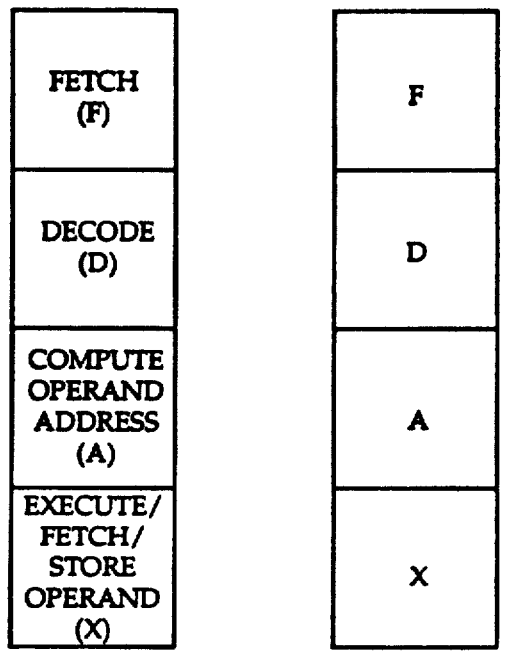
FIG. 3a shows a prior art superscaler pipeline architecture.
Figure 3B:
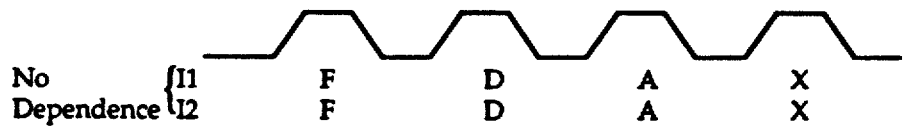
Figure 3C:
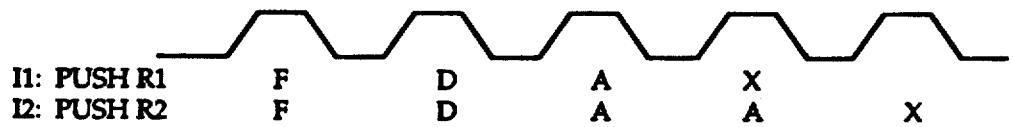
Figure 3D:
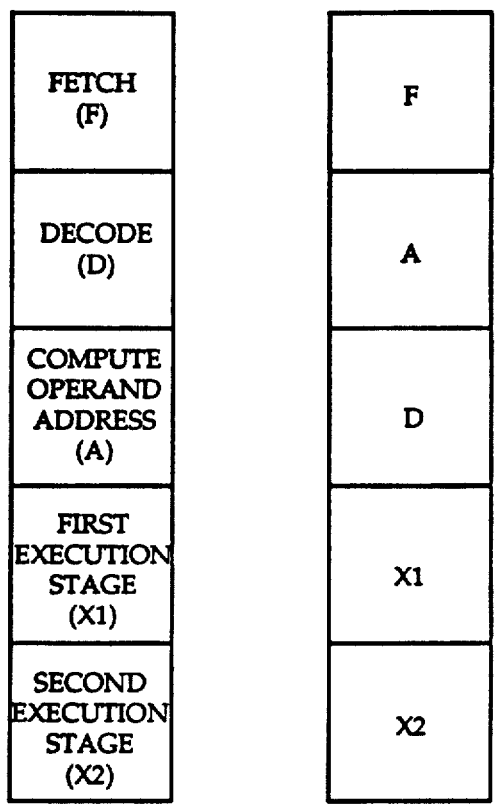
FIG. 3d shows another example of the prior art superscaler pipeline architecture.
Figure 3E:
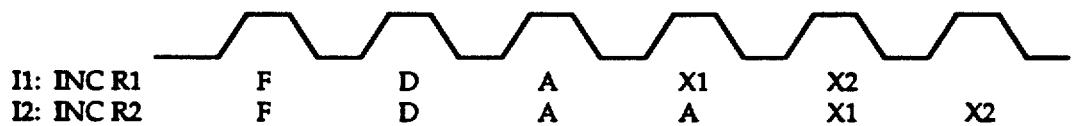
FIG. 3e shows the timing of the processing of two dependent instructions using the pipelines of FIG. 3d according to the prior art.

Referring back to FIG. 3c, it is noted that although a conventional superscaler pipeline begins processing two dependent instructions I1 and I2 (in the case of FIG. 3c, I1 and I2 are both PUSH instructions) at the same clock cycle, instruction I2 is completed one clock cycle after instruction I1 is completed. Thus, in the conventional superscaler pipeline architecture, the pipeline processing instruction I2 "stalls" for one clock cycle.

Figure 4B:
Figure 4C:
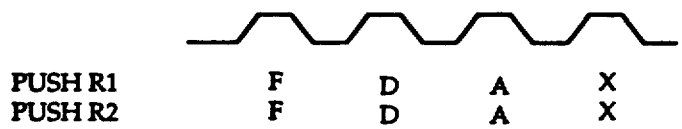

Now referring to FIGS. 4b and 4c of the present invention, it is noted that in the case of either the two independent instructions of FIG. 4b or the two dependent instructions of FIG. 4c (again two PUSH instructions are used as examples of the two dependent instructions of FIG. 4c), both instructions I1 and I2 are simultaneously completed.

Figure 4D:
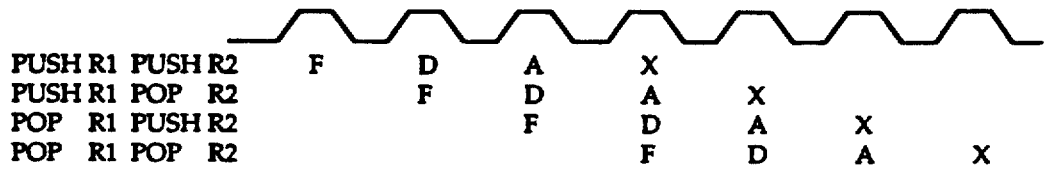

FIG. 4d further illustrates the function performed by the Advanced Cross Coupler of the present invention. FIG. 4d shows all four combinations of two consecutive PUSH and POP instructions. Simply stated, a POP instruction reads a numerical value out of a memory location addressed by the Stack Pointer Register, as contrasted with a PUSH instruction which writes a numerical value into a memory location addressed by the Stack Pointer Register. As such, PUSH and POP instructions are further examples of two dependent instructions. As illustrated by FIG. 4d, in each of the combinations of PUSH and POP instructions, both instructions I1 and I2 are completed simultaneously. As FIG. 4d illustrates, it follows that each pair of PUSH and POP instructions is completed one clock cycle after a previous pair. Therefore, in this example, the pipelining system of the present invention completes eight instructions during the same time period that only four instructions are completed according to the prior art superscaler pipeline architecture.

Figure 5A:
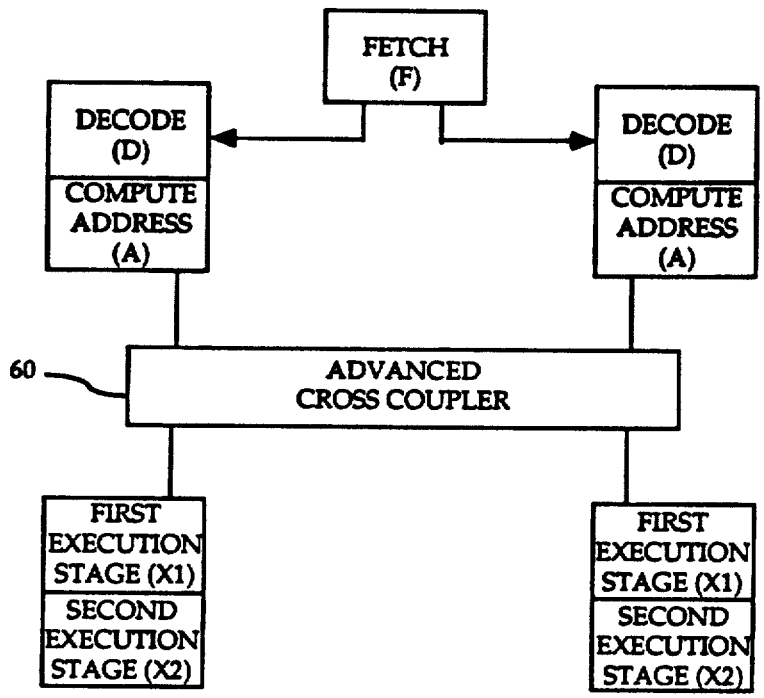
FIG. 5a shows another embodiment of the pipelining system of the present invention using the Advanced Cross Coupler with two pipelines, where each pipeline has five stages.

Now using the example of INCREMENT instructions, it is recalled that according to the conventional superscaler pipeline architecture and when I1 and I2 are both INCREMENT instructions, I2 is completed one clock cycle after I1 is completed. However, according to the Advanced Cross Coupler of the present invention, two consecutive INCREMENT instructions are simultaneously completed. The example of an INCREMENT instruction also illustrates that the present invention applies to pipelines of any length. In that regard, FIG. 5a shows that the present invention also applies to an instruction, for example the INCREMENT instruction, which requires a pipeline having five stages rather than the four stages discussed thus far. In fact, the present invention applies to other instructions not covered by FIG. 5a, which need a pipeline having more than five stages. Some instructions require a pipeline longer than the four stages discussed thus far, essentially because the completion of these instructions requires performance of a relatively large number of operations by the microprocessor. Thus, referring again to FIG. 5a, X1 stands for execution of an instruction's certain operations requiring one clock cycle, and X2 stands for execution of that instruction's remaining operations consuming an additional clock cycle.

Figure 5B:
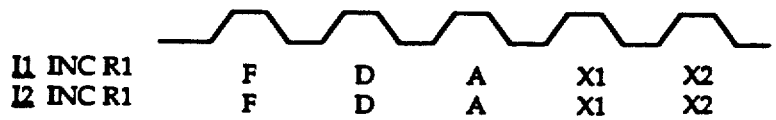
Figure 5C:
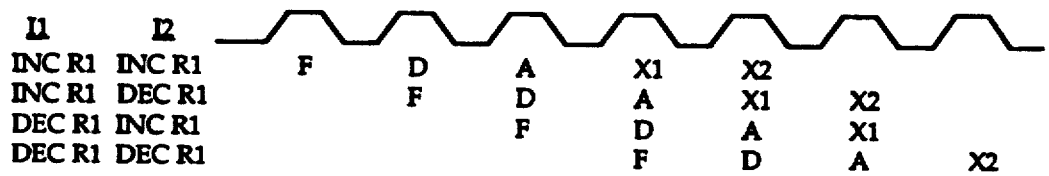

Now referring to FIG. 5b, it is shown that according to the present invention, two consecutive INCREMENT instructions are simultaneously completed. FIG. 5c, shows all four combinations of INCREMENT and DECREMENT (referred to as DEC) instructions. As shown in FIG. 5c, instruction I1 and instruction I2 in any of these four combinations are completed simultaneously. Thus, as FIG. 5c illustrates, each pair of instructions is completed only one clock cycle after the previous pair. Therefore, in this example, the pipelining system of the present invention processes eight instructions during the same time period that the prior art superscaler pipeline can process only four instructions.

Figure 6A:
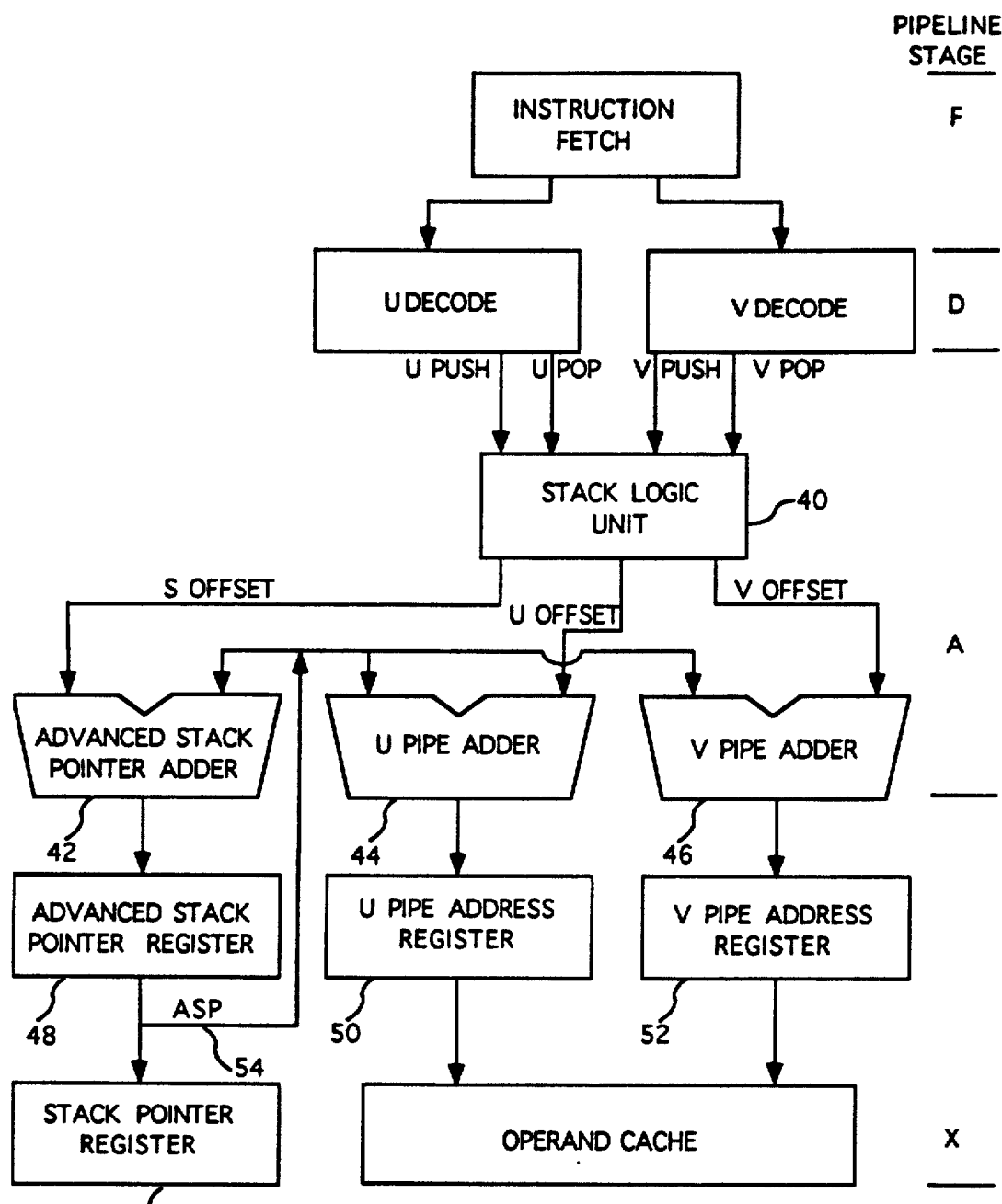

Now referring to FIG. 6a, the Advanced Cross Coupler 30 of FIG. 4a is shown in detail. Here again, for ease of illustration, PUSH and POP instructions are used. Signals U PUSH, U POP, V PUSH and V POP feed the Stack Logic Unit 40. The status of these signals is determined from the result of the operations of the Decode stages of the U and V pipelines. Thus, these signals are "high" or "low" depending on whether the instruction being processed is a PUSH or a POP instruction and also depending on whether pipeline U or pipeline V is processing the instruction. The Stack Logic Unit 40 receives the Logic Unit input signals U PUSH, U POP, V PUSH, and V POP and based on the status of these signals the Stack Logic Unit 40 determines the status of the Logic Unit output signals S OFFSET, U OFFSET, and V OFFSET. Furthermore, the Stack Logic Unit 40 updates the status of signals S OFFSET, U OFFSET, and V OFFSET simultaneously (in other words during the same clock cycle). Signal U OFFSET is connected to a first Adder Input Receiver of the U Pipe Adder 44 and Signal V OFFSET is connected to a first Adder Input Receiver of the V Pipe Adder 46. Furthermore, Advanced Stack Pointer 48, through its output signal 54, is connected to a second Adder Input Receiver of U Pipe Adder 44 and similarly to a second Adder Input Receiver of V Pipe Adder 46. Further, U Pipe Adder 44 and V Pipe Adder 46 add the present numerical value stored in the Advanced Stack Pointer Register 48 to the numerical values of the signals U OFFSET and V OFFSET respectively.

The result of the Add operations is placed on the respective adder output signals and is then stored in U Pipe Address Register 50 and V Pipe Address Register 52 respectively. The numerical values thus stored in each register are used to address microprocessor memory locations so that certain data may be written into the microprocessor memory locations or read therefrom. Thus, two memory locations are addressed by the U Pipe Address Register 50 and V Pipe Address Register 52 simultaneously so that two Memory Read/Write operations may be performed. As such, two dependent instructions, in this case any of the four combinations of PUSH and POP instructions are simultaneously completed.

Still referring to FIG. 6a, Advanced Stack Pointer Adder 42 receives the signal S OFFSET from the Stack Logic Unit 40 to offset the numerical value stored in the Advanced Stack Pointer Register 48 by the numerical value represented by the signal S OFFSET. This modified numerical value of the Advanced Stack Pointer Register 48 is stored in the Advanced Stack Pointer Register 48. However, this modified numerical value is not placed on the ASP line 54 until one clock cycle after the completion of the PUSH and POP instructions. It should be pointed out that the change in the numerical value of the Advanced Stack Pointer Register 48 during the PUSH and POP instructions represents a modified numerical value of the Stack Pointer Register, without any concomitant change in the numerical value of the Stack Pointer Register 56 itself. Thus, the value of the Stack Pointer Register 56 itself is not updated until after the completion of all the consecutive PUSH and POP instructions.

Now the operation of the Advanced Cross Coupler illustrated in FIG. 6a is clarified by way of examples. First, suppose that two PUSH instructions are to be concurrently processed through the U and V pipelines. Therefore, both U PUSH and V PUSH signals are set to a "high" state by he Decode stages of the U and V pipelines respectively, while the signals U POP and V POP are placed in the "low" state. Thereafter, the Stack Logic Unit 40 determines the status of the U OFFSET, V OFFSET, and S OFFSET signals based on the high states of the U PUSH and V PUSH signals. Since each PUSH operation requires the Stack Pointer Register to be decremented by a value of "2" before the two PUSH instructions' Memory Write operations are performed, the U OFFSET signal loads a value of "−2" into the U Pipe Adder and, simultaneously, the V OFFSET signal loads a value of "−4" into the V Pipe Adder. Thus, while the numerical value of Stack Pointer Register 56 is still unchanged, the numerical value of the Advanced Stack Pointer Register 48 is decremented by a value of "2" and the decremented value is stored in the U Pipe Address Register 50. Similarly, the numerical value of the Advanced Stack Pointer Register 48 is decremented by a value of "−4" and the decremented value is stored in the V Pipe Address Register 52. At this point, two Memory Write operations are performed simultaneously such that certain data can be stored into the memory location addressed by the U Pipe Address Register 50 and certain other data can be stored into the memory location addressed by the V Pipe Address Register 52.

Still referring to FIG. 6a and the above example of two concurrent PUSH instructions, the Stack Logic Unit will determine the status of the S OFFSET signal simultaneously with that of the U OFFSET and V OFFSET signals above. In the example above, the value of S OFFSET will be "−4." Thus, simultaneous with the updating of the numerical values of the U Pipe Address Register 50 and V Pipe Address Register 52, the numerical value of the Advanced Stack Pointer Register 48 would be decremented by a value of "4."

However, this decremented value is not outputted on the ASP line until after the two PUSH instructions leave the address computation stage. Further, the numerical value of the Stack Pointer Register itself is still unchanged at this point. One clock pulse after the two PUSH instructions are leave the address computation stage, the Advanced Stack Pointer Register 48 outputs its decremented value on the ASP line. Also, as the instruction pair leaves the Execute stage, the Stack Pointer Register is decremented by a value of "4." Therefore, after the completion of the two PUSH instructions, both the Stack Pointer Register 56 and the Advanced Stack Pointer Register 48 hold the same numerical values.

Now, as a further example for clarifying the operation of the Advanced Cross Coupler of the present invention, the status of various signals of the Advanced Cross Coupler is explained for a second combination of PUSH and POP instructions. Thus, the next exemplary combination is that of processing a PUSH instruction through the U pipeline, and a POP instruction through the V pipeline. In this combination, signals U PUSH and V POP will be in a high state, and signals U POP and V PUSH will be in a low state. Here, as in the first combination above, the U OFFSET signal loads a value of "−2" into the U Pipe Adder. In contrast with the U OFFSET signal value which was determined for the PUSH instruction being processed through the U pipeline, the value represented by the V OFFSET signal must be determined by the memory address required for performing a Memory Read operation for the POP instruction being processed through the V pipeline. In that regard, since a POP instruction must read data from a memory location addressed by the unadjusted Stack Pointer Register, the V OFFSET signal must have a numerical value that results in the V Pipe Address Register 52 representing the present numerical value stored in the Stack Pointer Register, as adjusted only for the concurrent PUSH instruction being processed through the U Pipe. Thus, V OFFSET will also load a value of "−2" into the V Pipe Adder. As such, the POP instruction of the present example is performed by reading from the memory location addressed by the Stack Pointer Register, as adjusted only by the first PUSH instruction.

Still referring to the above example, the status of the S OFFSET signal is now discussed. In that regard, based on the sequence of operations required to be performed during a POP instruction, the Stack Pointer Register must be incremented by a value of "+2" after the POP instruction's Memory Read operation discussed above is completed. It is also recalled that the Stack Pointer Register must be decremented by "2" pursuant to a PUSH instruction. Further, since according to a POP instruction, after the Memory Read operation the value of the Stack Pointer Register must be incremented by "+2," the Stack Pointer Register must end up at the same numerical value that it had before the beginning of the PUSH and POP instructions. As such, the new numerical value placed on the ASP line, representing the new numerical value of the Stack Pointer Register, must be the same as the old numerical value on the ASP line. Therefore, the S OFFSET signal must load a value of "0" into the Stack Intermediate Adder.

FIG. 6b illustrates the numerical values represented by various signals of FIG. 6a in the two combinations of PUSH and POP instructions discussed above in addition to the two remaining combinations. The first of these two remaining combinations is that of processing a POP instruction through the U pipeline and another POP instruction through the V pipeline. And the second is that of processing a POP instruction through the U pipeline, and a PUSH instruction through the V pipeline.

Figures 7A, 7B:
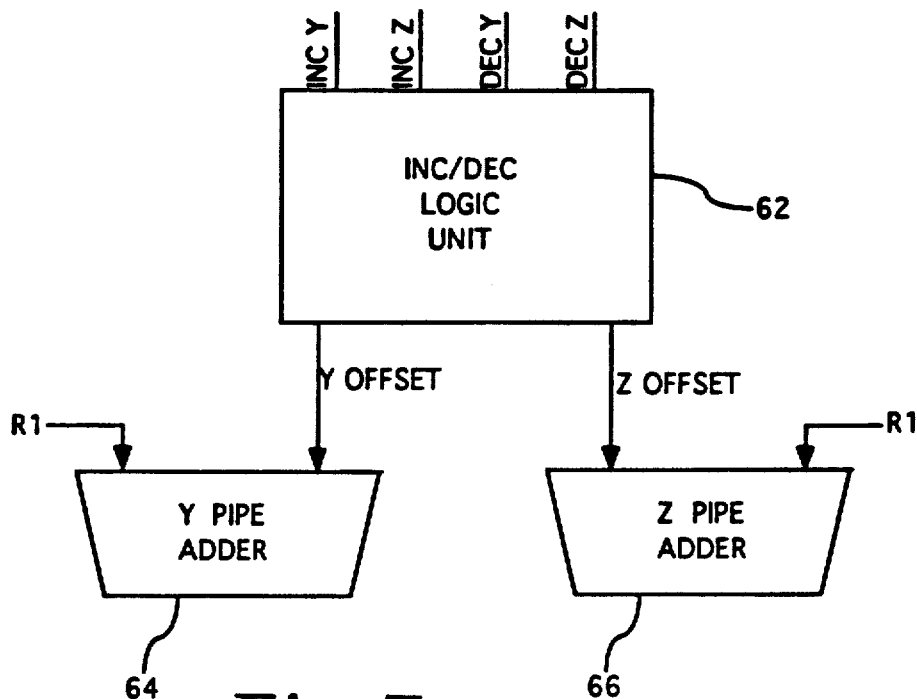

Now referring back to FIG. 5a, the Advanced Cross Coupler 60 of the present invention is shown, in block diagram form, for the case of two consecutive INCREMENT and DECREMENT instructions. Now referring to FIG. 7a, an embodiment of the Advanced Cross Coupler 60 of FIG. 5a which is suited for the processing of INCREMENT and DECREMENT instructions is illustrated in detail. FIG. 7a illustrates how the Advanced Cross Coupler 60 of FIG. 5a enables pipelines Y and Z to complete any combination of two INCREMENT and DECREMENT instructions simultaneously. It is noted that the Advanced Cross Coupler illustrated in FIG. 7a expedites the performance of INCREMENT and DECREMENT instructions as performed on Register R1. Nevertheless, the Advanced Cross Coupler illustrated in FIG. 7a may expedite the processing of INCREMENT and DECREMENT instructions performed on any of the various microprocessor registers. This can be done simply by replacing the signal representing R1 in FIG. 7a with a signal representing another one of the various microprocessor registers. Thus, using Register R1 in the present example, during the execution stage X1 of an INCREMENT instruction the numerical value of Register R1 is incremented. Further, during the execution stage X2 of the INCREMENT instruction, another operation, for example a Write to a memory location addressed by the new value of R1, may be performed.

Now still referring to FIG. 7a, suppose that one INCREMENT instruction is being processed through the Y pipeline by setting the Logic Unit input signal INC Y to a high state. Similarly suppose that another INCREMENT instruction is being processed through the Z pipeline by setting the Logic Unit input signal INC Z to a high state. In this example, the INC/DEC Logic Unit 62 will output a value of "+1" on the Logic Unit output signal Y OFFSET and a value of "+2" for the Logic Unit output signal Z OFFSET. Thus, the Y OFFSET signal, through a first Y Pipe Adder Input Receiver, will load a value of "+1" into the Y Pipe Adder. Furthermore, the Z OFFSET signal, through a first Z Pipe Adder Input Receiver, will load a value of "+2" into the Z Pipe Adder. Moreover, the numerical value of a microprocessor register, for example register R1, is provided to a second Y Pipe Adder Input Receiver and similarly to a second Z Pipe Adder Input Receiver. Therefore, the numerical value available for stage X2 of the Y pipeline will be R1+1, while stage X2 of the Z pipeline can simultaneously use the numerical value of R1+2.

As a second example, suppose that the Y pipeline is processing an INCREMENT instruction, while the Z pipeline is processing a DECREMENT instruction. In this case, the signal Y OFFSET will load a value of "+1" into the Y Pipe Adder and the signal Z OFFSET will load a value of "0" into the Z Pipe Adder. The status of various signals of the Advanced Cross Coupler of FIG. 7a for the two combinations of INCREMENT and DECREMENT instructions discussed so far, in addition to the remaining two combinations thereof, are illustrated in FIG. 7b.

Figure 8A:
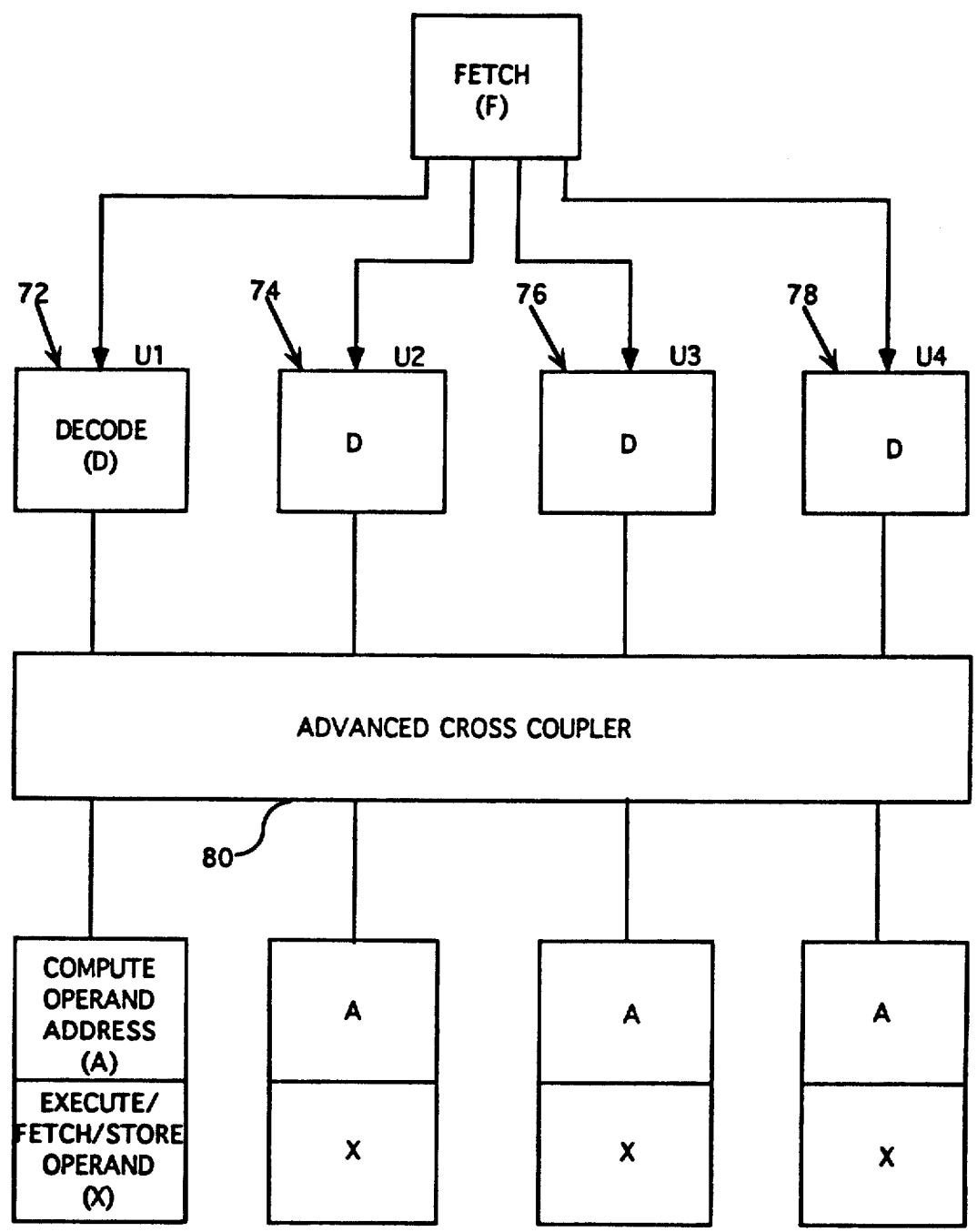
FIG. 8a shows another embodiment of the pipelining system of the present invention using the Advanced Cross Coupler with four pipelines where each pipeline has four stages.

Thus far, FIGS. 4a, 5a, 6a, and 7a have shown only simplified embodiments of the present invention. These simplified embodiments of the present invention only show two pipelines U and V in FIGS. 4a and 6a, and two pipelines Y and Z in FIG. 5a and 7a. These simplified embodiments of the present invention were used for ease of description of the Advanced Cross Coupler of the present invention. However, the Advanced Cross Coupler of the present invention is used, with even more utility, where the number of pipelines is more than two. Thus, FIG. 8a illustrates an embodiment of the present invention which utilizes four pipelines to process any of the sixteen combination of four dependent instructions, for example four PUSH and POP instructions, such that all four instructions are simultaneously completed. Thus, supposing that each of the pipelines U1 through U4 in FIG. 8a is processing a PUSH instruction, the Advanced Cross Coupler 80 provides for simultaneous completion of all four PUSH instructions.

Figure 8B:
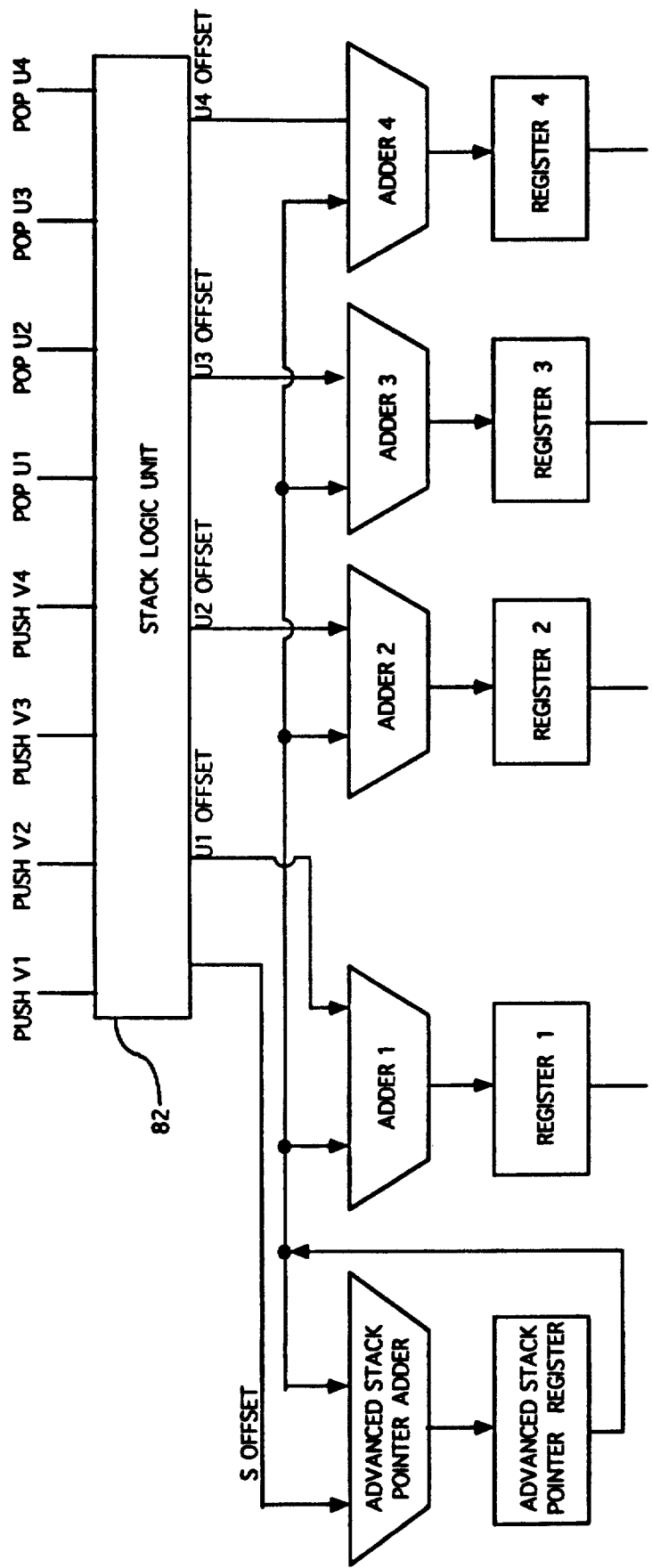

The Advanced Cross Coupler 80 of FIG. 8a is illustrated in detail in FIG. 8b. The operation of the Advanced Cross Coupler of FIG. 8b is analogous to that of the more simple case of FIG. 6a. Thus, the detailed status of signals is not discussed here. Therefore, analogous to FIG. 6a, Registers 1-4 of the Advanced Cross Coupler 80 of FIG. 8b simultaneously address a memory location with an adjusted value of the Stack Pointer Register. Referring back to the example of four PUSH instructions, while according to the prior art superscaler pipeline architecture each PUSH instruction is completed one clock cycle after a previous PUSH instruction, the Advanced Cross Coupler of the present invention expedites the process of completing the four PUSH instructions by four clock cycles. While only the example of four PUSH instructions was discussed here, any of the other fifteen combinations of PUSH and POP instructions are processed through pipelines U1 through U4 in a similar manner.

Figure 9A:
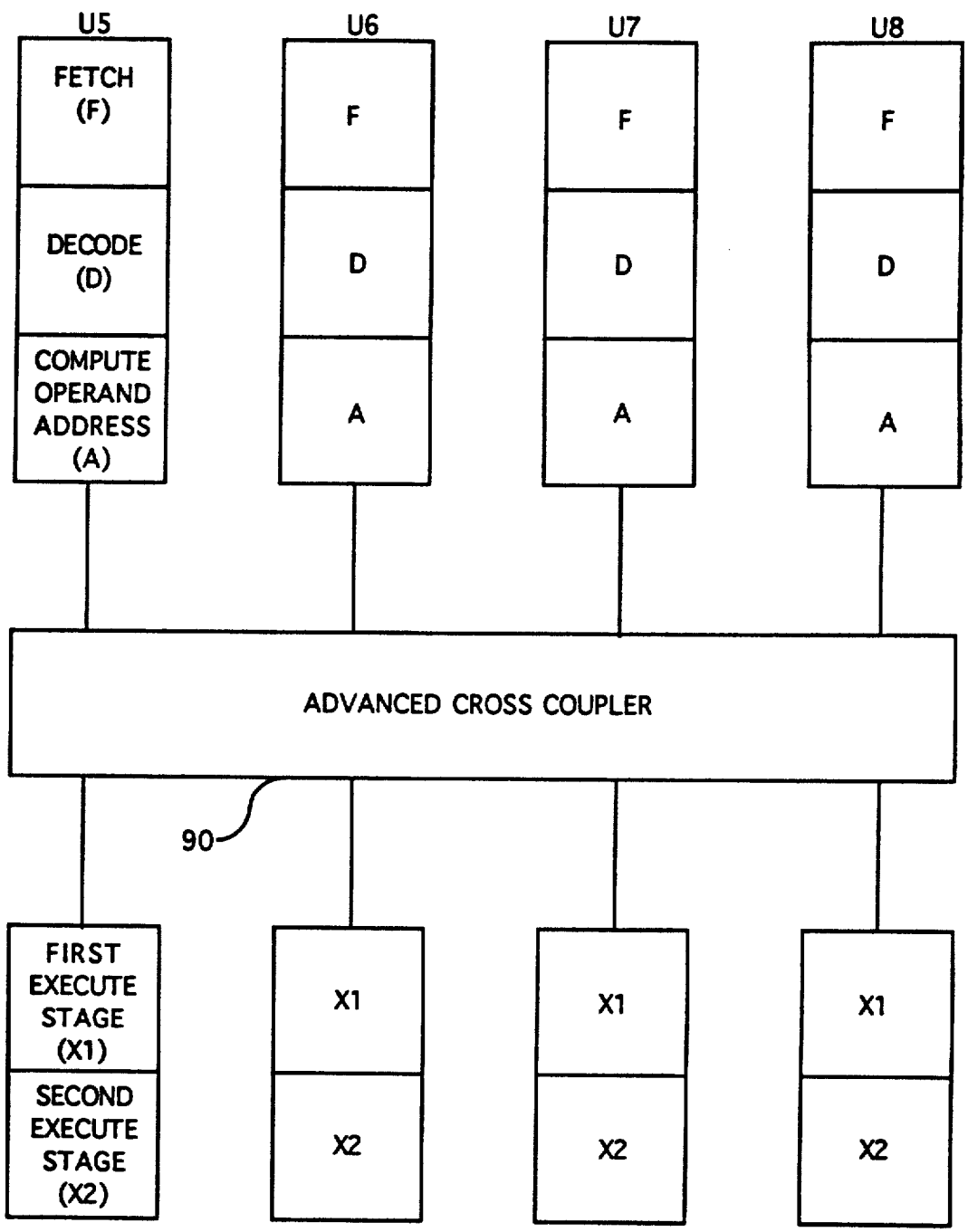
FIG. 9a shows another embodiment of the pipelining system of the present invention using the Advanced Cross Coupler with four pipelines where each pipeline has five stages.

FIG. 9a shows an embodiment of the present invention suited for performing four INCREMENT and DECREMENT instructions. Thus, any of the sixteen possible combinations of INCREMENT and DECREMENT instructions processed by pipelines U5 through U8 are completed simultaneously by using the Advanced Cross Coupler 90 of FIG. 9a.

Figure 9B:
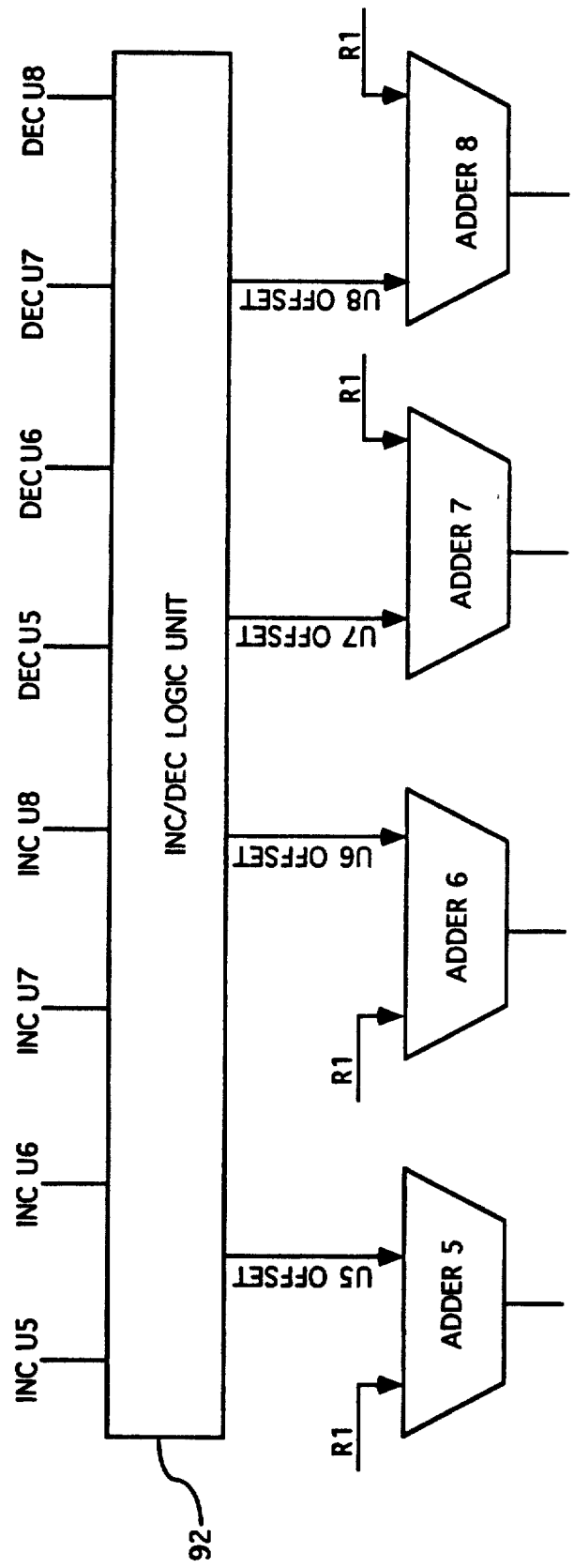

Now referring to FIG. 9b, the Advanced Cross Coupler 90 of FIG. 9a is shown in detail. As shown in FIG. 9b, the INC/DEC Logic Unit 92 receives the INC U5 through INC U8 and the DEC U5 through DEC U8 signals. Thereafter, the status of signals U5 OFFSET through U8 OFFSET are simultaneously determined by the INC/DEC Logic Unit 92. Also, Adder 5 through Adder 8 determine the numerical value to be forwarded to pipelines U5 through U8. Therefore, by using the four pipelines U5 through U8 in conjunction with the Advanced Cross Coupler 90 of the present invention, any of the sixteen combinations of four INCREMENT and DECREMENT instructions are simultaneously completed. The prior art superscalers, on the other hand, require a delay of one clock cycle between the completions of consecutive INCREMENT and DECREMENT instructions. Since the operation of the Advanced Cross Coupler shown in FIG. 9b is analogous to that of the Advanced Cross Coupler 60 shown in FIG. 7a, the status of the various signals of the Advanced Cross Coupler of FIG. 9b is not discussed herein.

The present invention therefore discloses apparatus and methods for the simultaneous completion of two or more dependent instructions. This simultaneous completion of two or more dependent instructions is achieved by the use of the Advanced Cross Coupler in the microprocessor pipelining system of the present invention.

Furthermore, it must be emphasized that although those embodiments of the present invention using only two pipelines were discussed in more detail than the embodiments of the present invention using four pipelines, the present invention equally encompasses the four-pipeline embodiments of the Advanced Cross Coupler. Thus, the detailed treatment of the two-pipeline embodiments of the present invention was only for ease of illustration. Furthermore and by the same token, although the present invention was discussed only in terms of two or four pipelines, the Advanced Cross Coupler of the present invention applies to a system with any number of pipelines.

Also and again for ease of illustration, the present invention was illustrated using only the examples of PUSH, POP, INCREMENT, and DECREMENT instructions. However, the Advanced Cross Coupler of the present invention applies, with equal utility, to any set of two or more dependent instructions.

Finally, while the Advanced Cross Coupler of the present invention has been disclosed and described with respect to preferred embodiments thereof, it will be understood that the apparatus and methods of the present invention may be varied without departing from the spirit and scope thereof.

I claim:

1. A microprocessor comprising:
   pipelining means for processing a plurality of instructions wherein the processing of at least one of said plurality of instructions is dependent on the result of processing of another of said plurality of instructions, said pipelining means comprising a plurality of pipelines, each of said plurality of pipelines having a plurality of pipeline stages, said plurality of pipeline stages include a decode stage, an address computation stage, and an execution stage;
   said pipelining means processing each of said plurality of instructions through each of said plurality of pipeline stages of a pipeline of said plurality of pipelines;
   said pipelining means further comprising a pipeline coupling means coupled to two or more pipelines, including logic unit means for receiving a plurality of logic unit input signals, each of said plurality of logic unit input signals representing an instruction processed in a corresponding one of said plurality of pipelines,
   said logic unit means further having means for simultaneously computing a plurality of logic unit output signals, each of said plurality of logic unit output signals specifying a corresponding offset value for each of said plurality of pipelines dependent upon at least one of said plurality of logic unit input signals, each of said corresponding offset values to be simultaneously added to a numerical value stored in an address register to obtain a pipeline result for each of said plurality of pipelines.

2. The microprocessor of claim 1, wherein said plurality of instructions are instructions wherein memory locations of said microprocessor are addressed for writing thereto or reading therefrom, and wherein said pipeline results are addresses of said memory locations, said addresses determined by adding said offset value to said numerical value, wherein said numerical value is stored in a Stack Pointer Register.

3. The microprocessor of claims 1 or 2 wherein said plurality of stages of said plurality of pipelines include a fetch stage, an instruction decode stage, an address computation stage, and an execution stage.

4. The microprocessor of claim 1, wherein said plurality of instructions are instructions for incrementing or decrementing said numerical value, said numerical value being stored in a register of said microprocessor.

5. The microprocessor pipelining system of claims 1 or 4, wherein said plurality of stages of said plurality of pipelines include a fetch stage, an instruction decode stage, an address computation stage, a first execution stage, and a second execution stage.

6. The microprocessor of claim 1, wherein said pipeline coupling means simultaneously executes said instructions whose processing begins in the same microprocessor clock cycle.

7. A microprocessor comprising:
pipelining means for processing a plurality of instructions, wherein said plurality of instructions are instructions wherein memory locations of said microprocessor are addressed for writing thereto or reading therefrom, and wherein addresses of said memory locations are determined by adding an offset value to a numerical value stored in a Stack Pointer Register;
said pipelining means comprising a plurality of pipelines, each of said plurality of pipelines having a plurality of pipeline stages;
said pipelining means processing each of said plurality of instructions through each of said plurality of pipeline stages of a pipeline of said plurality of pipelines;
said pipelining means further comprising a pipeline coupling means coupled to at least two pipelines and including a logic unit means for receiving a plurality of logic unit input signals, each of said plurality of logic unit input signals representing an instruction processed in a corresponding one of said plurality of pipelines;
said logic unit means further having means for simultaneously computing a plurality of logic unit output signals, each of said plurality of logic unit output signals specifying a corresponding offset value for each pipeline dependent upon at least one of said plurality of logic unit input signals, each of said corresponding offset values to be added to the numerical value stored in said Stack Point Register;
said pipeline coupling means further having an adding means, coupled to said logic unit means, comprised of a plurality of adders, each of said adders having a first adder input receiver, wherein said first adder input receiver of each of said adders is connected to one of said logic unit output signals of said logic unit means;
each of said adders of said plurality of adders including means for simultaneously computing a sum of said corresponding offset value of each of said plurality of logic unit output signals and said numerical value stored in said Stack Pointer Register, each of said adders further outputting said sum as an adder output signal;

said pipeline coupling means further having an output register means, coupled to said adding means, comprised of a plurality of output registers, wherein each of said plurality of output registers receives an adder output signal of one of said adders; and
wherein one of said plurality of output registers is connected to a second adder input receiver of each of said adders for providing an updated value of said Stack Pointer Register to each of said adders, wherein said updated value of said Stack Pointer Register is added to said corresponding offset value of each of said plurality of logic unit output signals.

8. The microprocessor of claim 7, wherein said plurality of pipelines is comprised of four pipelines, and wherein said plurality of adders is comprised of five adders, and wherein said plurality of output registers is comprised of five output registers, and wherein said first plurality of said plurality of output registers is comprised of four output registers.

9. The microprocessor of claim 7, wherein said plurality of pipelines is comprised of two pipelines, and wherein said plurality of adders is comprised of three adders, and wherein said plurality of output registers is comprised of three output registers, and wherein said first plurality of said plurality of output registers is comprised of two output registers.

10. The microprocessor pipelining system of claims 7, 8, or 9, wherein said plurality of stages of a pipeline of said plurality of pipelines include a fetch stage, an instruction decode stage, an address computation stage, and an execution stage.

11. The microprocessor of claim 7, wherein a first plurality of said plurality of output registers simultaneously addresses said microprocessor memory locations for those locations which are not the same as any other locations.

12. The microprocessor of claim 7, wherein said pipeline coupling means simultaneously executes said instructions whose processing begins in the same microprocessor clock cycle.

13. A microprocessor comprising:
pipelining means for processing a plurality of instructions, wherein said plurality of instructions are instructions for incrementing or decrementing the numerical value of various registers of said microprocessor;
said pipelining means comprising a plurality of pipelines, each of said plurality of pipelines having a plurality of pipeline stages;
said pipelining means processing each of said plurality of instructions through each of said plurality of pipeline stages of a pipeline of said plurality of pipelines;
said pipelining means further comprising a pipeline coupling means, coupled to two or more pipelines, and including a logic unit means for receiving a plurality of logic unit input signals, each of said plurality of logic unit input signals representing an instruction processed in a corresponding one of said plurality of pipelines;
said logic unit means further having means for simultaneously computing a plurality of logic unit output signals, each of said plurality of logic unit output signals specifying a corresponding offset value for each of said plurality of pipelines dependent upon at least one of said plurality of logic unit input signals, said corresponding offset value to be added to the numerical values of said various registers of said microprocessor;

said pipeline coupling means further having adding means, coupled to said logic unit means, comprised of a plurality of adders, each of said adders having a first adder input receiver, wherein said first adder input receiver of each of said adders is connected to one of said logic unit output signals of said logic unit means;

each of said adders further including a second adder input receiver, wherein said second adder input receiver of each of said adders is coupled to one of said various registers of said microprocessor so as to receive said numerical value of one of said various registers of said microprocessor; and wherein each of said adders of said plurality of adders has means for simultaneously computing a sum of said offset values of each of said plurality of logic unit output signals and said numerical values of one of said various registers of said microprocessor, and wherein said sum is the new numerical value of one of said various registers of said microprocessor.

14. The microprocessor of claim 13, wherein said plurality of pipelines is comprised of four pipelines, and wherein said plurality of adders is comprised of four adders.

15. The microprocessor of claim 13, wherein said plurality of pipelines is comprised of two pipelines, and wherein said plurality of adders is comprised of two adders.

16. The microprocessor pipelining system of claims 13, 14, or 15, wherein said plurality of stages of a pipeline of said plurality of pipelines include a fetch stage, an instruction decode stage, an address computation stage, a first execution stage, and a second execution stage.

17. The microprocessor of claim 13, wherein said pipeline coupling means simultaneously executes said instructions whose processing begins in the same microprocessor clock cycle.

18. In a microprocessor a method of processing a plurality of instructions, wherein the processing of at least one of said plurality of instructions is dependent on the result of processing of another of said plurality of instructions, said method comprising the steps of:

providing a pipelining means for processing said plurality of instructions;

providing a plurality of pipelines for said pipelining means, each of said plurality of pipelines having a plurality of pipeline stages, wherein said plurality of pipeline stages include a decode stage, an address computation stage, and an execution stage;

coupling said plurality of pipelines to each other with a pipeline coupling means, said pipeline coupling means including logic unit means and adding means;

said logic unit means receiving at least two input signals, each input signal representing an instruction processed in a corresponding one of said plurality of pipelines;

said logic unit means simultaneously computing an output signal specifying a corresponding offset value for each of said plurality of pipelines, each corresponding offset value dependent upon at least one of said input signals; and said adding means simultaneously adding each corresponding offset value to a numerical value to obtain a pipeline result for each of said plurality of pipelines.

19. The method of claim 18, wherein said plurality of stages of said plurality of pipelines include a fetch stage, an instruction decode stage, an address computation stage, and an execution stage.

20. The method of claim 18, wherein said plurality of stages of said plurality of pipelines are comprised of a fetch stage, an instruction decode stage, an address computation stage, a first execution stage, and a second execution stage.

21. The method of claims 18, 19, or 20, wherein said plurality of pipelines is comprised of four pipelines.

22. The method of claims 18, 19, or 20, wherein said plurality of pipelines is comprised of two pipelines.

23. The microprocessor of claim 18, wherein said pipeline coupling means simultaneously executes said instructions whose processing begins in the same microprocessor clock cycle.

* * * * *

UNITED STATES PATENT AND TRADEMARK OFFICE
CERTIFICATE OF CORRECTION

PATENT NO. : 5,283,874
DATED : February 1, 1994
INVENTOR(S) : Gary N. Hammond

It is certified that error appears in the above-indentified patent and that said Letters Patent is hereby corrected as shown below:

Title Page: [54] Delete "Cross Coupling Mechanisms For Simultaneously Completing Consecutive Pipeline Instructions Even If They Begin To Process At The Same Microprocessor Of The Issue Fee"

Insert --Cross Coupling Mechanisms For Simultaneously Completing Consecutive Pipeline Instructions Even If They Begin To Process At The Same Microprocessor Clock Cycle--

Signed and Sealed this

Twenty-seventh Day of September, 1994

Attest:

BRUCE LEHMAN

*Attesting Officer*  *Commissioner of Patents and Trademarks*